United States Patent [19]
Wolf

[11] Patent Number: 5,369,762
[45] Date of Patent: Nov. 29, 1994

[54] METHOD FOR SORTING DATA IN A COMPUTER AT HIGH SPEED BY USING DATA WORD VALUES FOR ADDRESS LOCATIONS

[76] Inventor: William M. Wolf, 1 Longfellow Pl., Ste. 3123, Boston, Mass. 02114

[21] Appl. No.: 546,026

[22] Filed: Jun. 28, 1990

[51] Int. Cl.$^5$ .................. G06F 15/411; G06F 7/36
[52] U.S. Cl. .................. 395/600; 364/DIG. 1; 364/222.81; 364/222.9
[58] Field of Search .................. 395/600, 425; 340/146.2; 364/715.07

[56] References Cited

U.S. PATENT DOCUMENTS

| | | | |
|---|---|---|---|
| 3,505,653 | 4/1970 | Kautz | 364/900 |
| 3,568,155 | 3/1971 | Abraham et al. | 364/300 |
| 3,662,402 | 5/1972 | Bond et al. | 364/300 |
| 3,713,107 | 1/1973 | Barsamian | 340/172.5 |
| 3,815,083 | 6/1974 | Dirks et al. | 395/600 |
| 4,031,520 | 6/1977 | Rohner | 364/200 |
| 4,209,845 | 6/1980 | Berger | 364/900 |
| 4,210,961 | 7/1980 | Whitlow et al. | 364/300 |
| 4,417,321 | 11/1983 | Chang et al. | 364/900 |
| 4,425,617 | 1/1984 | Sherwood | 395/600 |
| 4,510,567 | 4/1985 | Chang et al. | 364/300 |
| 4,570,221 | 2/1986 | Martens | 364/200 |
| 4,575,798 | 3/1986 | Lindstron et al. | 364/300 |
| 4,595,995 | 7/1986 | Alles | 364/300 |
| 4,611,280 | 9/1986 | Linderman | 364/300 |
| 4,628,483 | 12/1986 | Nelsen | 364/900 |
| 4,809,158 | 2/1989 | McCauley | 364/200 |
| 5,030,077 | 6/1991 | Florence et al. | 364/900 |
| 5,117,495 | 5/1992 | Liu | 395/600 |
| 5,121,493 | 6/1992 | Ferguson | 395/600 |
| 5,146,590 | 9/1992 | Lorie et al. | 395/600 |

OTHER PUBLICATIONS

Tremblay, Jean-Paul, et al., "An Introduction to Data Structures with Applications", 1984 by McGraw-Hill, Inc., pp. 611-622.
Ralston, Anthony, et al., "Encyclopedia of Computer Science", 1st ed., 1976, pp. 604-606; 1393-1400.
Sedgewick, Robert, "Algorithms," 1983 by Addison-Wesley Pub. Co. Inc., pp. 201-210.
Lorin, Harold, "Sorting and Sort Systems", 1975 by Addison-Wesley Pub. Co., Inc., pp. 177-179.
Knuth, Donald E., "The Art of Computer Programming", vol. 3/Sorting and Searching, pp. 506-543.
Tremblay, Jean-Paul et al., "An Introduction to Data Structures with Applications," 1984 by McGraw-Hill, Inc., pp. 560-569.
Lorin, Harold, "Sorting and Sort Systems," 1975 by Addison-Wesley Publishing Co., Inc., pp. 162-166.

*Primary Examiner*—Paul V. Kulik
*Attorney, Agent, or Firm*—Jules Jay Morris; David J. Powsner

[57] ABSTRACT

The invention comprises a method of completely sorting an unsorted data table in a single pass through the data. The method uses a relatively large amount of computer memory, but sorts the data at great speed. Specifically, each unsorted data word is scaled to a size equal to or less than the number of address locations in a sort table. The scaled value created for each unsorted data word is converted to an address increment which is added to the initial address of the sort table. The unsorted data word is then stored into the sort table at the above calculated address that is related to the value of the data word. In this way, most words are placed in a sorted arrangement without comparison or iteration. The invention also comprises a method for resolving conflicts where a calculated address for an unsorted data word already contains a sorted data word. In this case both words are then sorted with respect to each other to create a data subclass and stored in an auxiliary storage table. In the case of subsequent conflicts, conflicting data is sorted and then moved en masse to yet a further location in auxiliary storage. A further element is a method of gathering and merging the data which has been sorted as described above. The gathering mode eliminates the null values between sorted data words and places the subclasses of resolved conflicts in sequence in the data table.

1 Claim, 7 Drawing Sheets

Figure 1

Where Sort Table Size = The next power of 2 greater than the Unsorted Data Table Size.

METHOD FOR SORTING DATA IN A COMPUTER AT HIGH SPEED BY USING DATA WORD VALUES FOR ADDRESS LOCATIONS

TECHNICAL FIELD

This invention relates to the sorting of data in electronic data processing systems. In particular, the invention relates to a method for constructing a sorted data file from unsorted data at high speed.

BACKGROUND OF THE INVENTION

Methods of mechanically or electromechanically sorting data into ascending or descending sequence dates back to the Herman Hollerith designed punch card, which was developed in the late nineteenth century. Hollerith was presented with the problem that the U.S. census data gathered in 1880 was never tabulated due to the inability of manually processing such an immense amount of data. Hollerith, a Census Bureau employee, proceeded to invent machines to tabulate and sort the data for the census of 1890, 1900 and the decades to follow. Improved versions of the Hollerith design continued to be used for the sorting of large amounts of data for many years to follow.

The advent of the modern electronic digital computer has facilitated the creation of computer based sorting methods that have replaced the electromechanical Hollerith-type machines. In the Hollerith-type devices, the punched card sorting techniques were predicated upon sorting one card column at a time, rather than all the punched columns which make up the data word. Through numerous iterations the ranked order of encoded data punched on the cards was determined. The digital computer has been devised with the ability to sort data in an internal memory. This permits digital computers to compare data words rather than just a single data column on each pass. The digital computer is far faster than the Hollerith-type sorting machines since not only can the whole word be comprehended at one time but the electronic computer operates at a far faster speed because it is purely electronic and does not rely on electromechanical handling and sorting devices.

In recent years, various innovative sorting techniques have been devised in an effort to increase the speed of the sorting process. Most of these techniques rely upon some type of iterative process in which the unsorted data is compared, categorized and handled through a varying number of iterations before the ranked order results in a sorted tabulation. For a large table of unsorted data, even modern electronic computers take considerable time to complete this iteration process. Some estimate that over twenty-five percent of the running time of modern computers is spent on the sorting of unsorted data.

It should also be noted that current data sorting techniques are slowed by increased data table size. The increased number of data words and consequent larger data tables to be sorted result in an increase in computer time required per item per table. This time increase per item varies with the method of sorting used but with all current methods, time increases with table size.

In view of the above, there is a need for a method of sorting data by a computer at higher speeds than is currently possible.

It is therefore an object of this invention to provide a high-speed data sorting method that will greatly reduce the amount of time digital computers require to sort large volumes of data.

It is a further object of this invention to greatly reduce the number of time consuming iterations required to completely process an unsorted data table.

It is yet another object of this invention to provide a data sorting method that reduces the sorting time increase that is generally brought about by enlarging data tables.

It is an advantage of this invention that the improvement in sorting speed greatly increases as table size increases since the time used by this technique increases linearly with table size rather than at some higher order.

SUMMARY OF THE INVENTION

The invention comprises a method of completely sorting an unsorted data table in a single pass through the data. By taking advantage of the tremendous decline in cost of computer memory, the preferred method uses a relatively large amount of computer memory in order to process unsorted data into a sorted sequence at great speed. This extensive use of computer memory space and associated expense is far outweighed by the tremendous increase in sorting speed offered by the method of this invention.

Specifically, in the preferred embodiment of the invention, a computer having a central processor and a memory section is operated to achieve high speed data sorting and storage. Each unsorted data word from an unsorted data table is scaled to a size equal to or less than the number of address locations in a table created to contain the sorted data. The scaled value created for each unsorted data word is converted to an address increment which is added to the initial address of the table created for the sorted data. According to this method, the unsorted data word is then stored into the table for sorted data at the above calculated address that is related to the value of the data word. In this way, most words are placed in a sorted arrangement without the necessity of comparison or iteration.

The preferred embodiment of the invention also comprises a method for resolving conflicts wherein a calculated address for an unsorted data word already contains a sorted data word. In this embodiment of the invention, both words are then sorted with respect to each other to create a data subclass and stored in an auxiliary storage table which is created beyond the location of the sorted data table. An address indicator is then created to specify the location of the data subclass in auxiliary storage. The indicator is devised to show that the subject address in the initial sorted data table contains a further address of a data subclass rather than a data word. In the case of subsequent conflicts, conflicting data is sorted and then moved en masse to yet a further location in auxiliary storage which accommodates the added size of the sorted entries which now comprise a larger data subclass.

A further element of the preferred embodiment comprises a method of gathering and merging the data which has been sorted as described above. It is preferred that when all of the addresses have been calculated and entries stored, a gathering mode is initiated in the computer which eliminates the zeroes or null values and places the subclasses of resolved conflicts in sequence in the data table. The result of this gathering and merging is a completely sorted data table.

The foregoing and other objects and advantages of this invention will be more apparent from the following more particular description of the preferred embodiment of the invention as illustrated in the accompanying drawings, in which like reference characters refer to the same steps and operations throughout the different views. The drawings have been devised merely to emphasize and illustrate the principles of the invention.

DETAILED DESCRIPTION OF THE INVENTION

This invention relies on the great reduction in cost of computer memory to permit a rapid, single-pass sort of unsorted data. In order to allow for this single-pass sort and required conflict resolution which results in a complete and reliable sort of the unsorted data, large data tables are created in which many addresses remain unused (empty) during the sort. Generally, the most significant digits of the unsorted data words are used to establish a scaled value which is used to identify an address in a data table. The entire data word is then stored at the identified address. Unsorted words having equal scaled values and therefore seeking the same address are separately compared and sorted in data subclasses.

Figure 1:
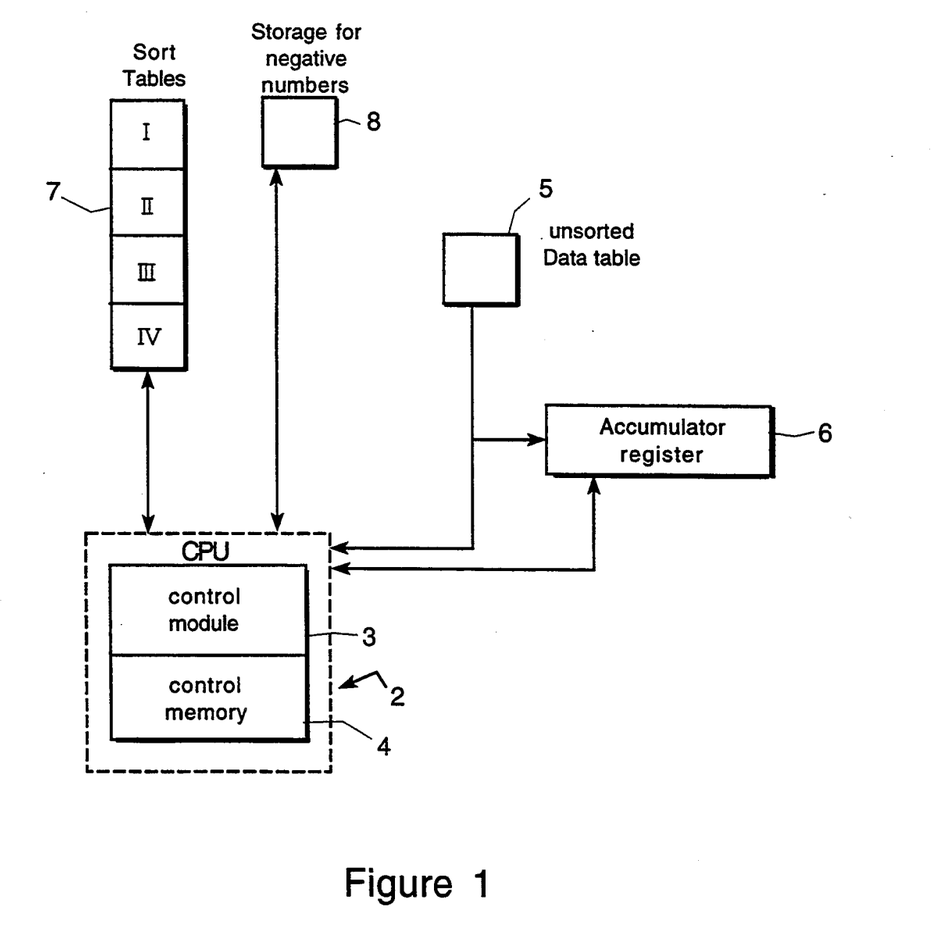
FIG. 1 is an idealized schematic of a computer system operated in accordance with the principles of this invention.
Figure 2A:
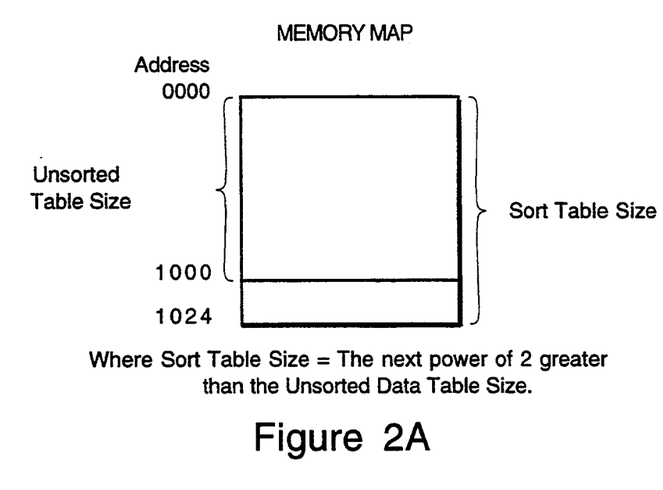
FIGS. 2A and 2B are idealized schematic representations of a computer memory map of the computer system of FIG. 1.
Figure 2B:
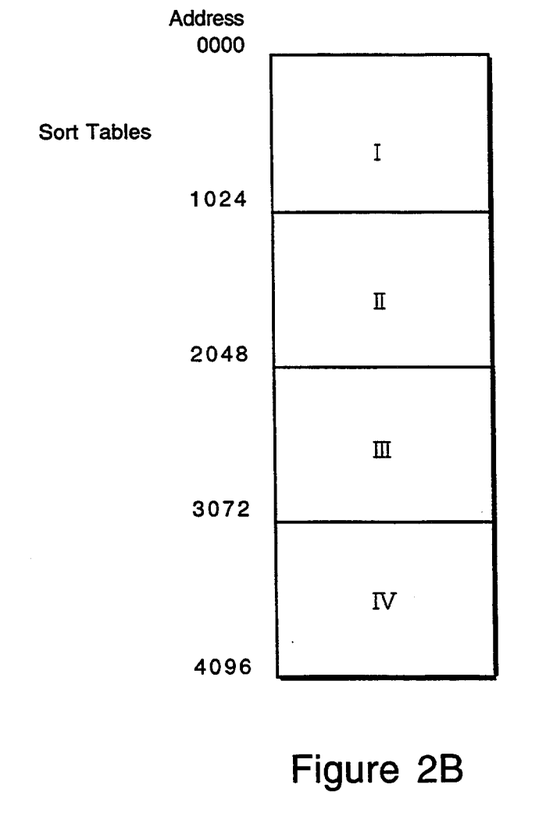

The simplified example of the above-referenced procedure is disclosed for the purpose of most easily illustrating the principles of this invention. In order to clearly illustrate the procedure, certain assumptions are made, all of which can be easily addressed by minor elaborations of this procedure. It is assumed that the unsorted data is in a table of sequentially addressed entries in binary form, as is most common in digital electronic computers. It is further assumed that all entries are positive in value. If, however, some of the entries are negative in value, one merely needs to double the size of the sort tables described below and duplicate the following procedure for the negative numbers. An idealized computer system and memory map which are constructed according to the principles of this invention are shown in FIGS. 1 and 2. In this computer system 1, a central processor unit (CPU) 2 is comprised of a control module 3 and control memory 4. The control memory 4 is for temporary data storage. An unsorted data table 5 will be read into the CPU for sorting. An accumulator register 6 will be used to form scaled values of the unsorted data words as described below. Finally, sort tables are constructed from a memory module 7. An additional memory module 8 may be required for the storage of negative numbers. All these elements have communication links for the transfer of data.

Prior to actually sorting the data, the amount of computer memory that is required for the single pass sort of the data must be determined. As will be clear after the complete discussion of the below procedure, substantially more memory space is required than that in which the unsorted data is stored. A primary sort table, table I in FIG. 2B, is created into which the unsorted data is to be placed according to its scaled value. It is defined as being equal in size to the next power of two greater than the number of storage locations used to store the unsorted data. For example, if the size of the unsorted data table is 1,000 words, then the next higher number having an integral power of two is 1,024, which is equal to the number 2 raised to the tenth power. According to the principles of this invention, auxiliary sort tables, II, III and IV, which are used for conflict resolution and gathering, as defined below, account for three more memory tables equal in size to the primary sort table. It is therefore desirable for this method that sufficient memory be available to accommodate four times the primary sort table size. It would certainly be possible to practice this invention and desirable in certain instances to use even a larger number of auxiliary sort tables. Using less than four sort tables of memory for a single pass sort, however, would be somewhat less efficient for most compilations of unsorted data, although still possible. The sort table size relative to the unsorted data table size as well as the layout of auxiliary sort tables is schematically represented in idealized form in FIGS. 2A and 2B.

Figure 3:
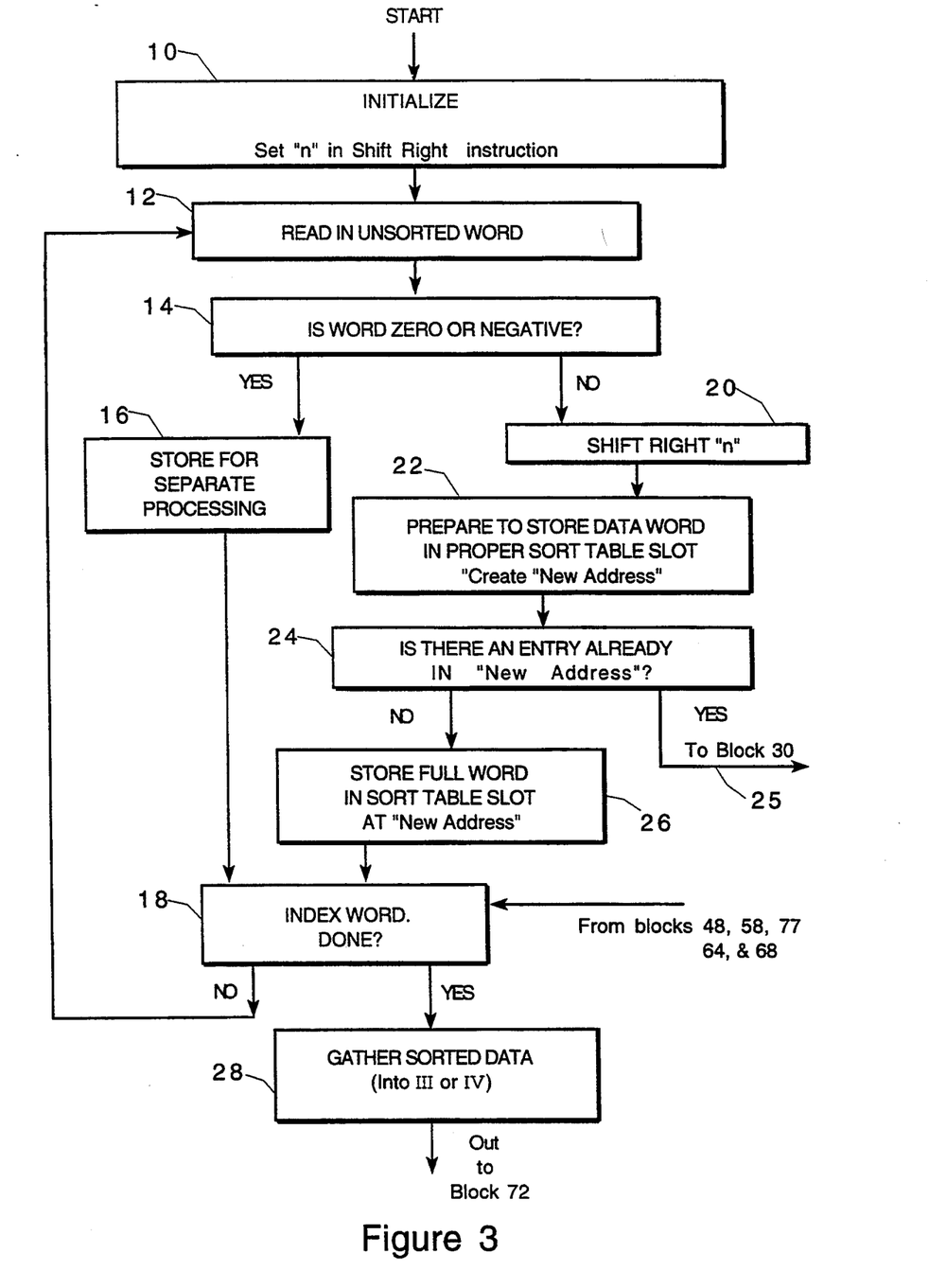
FIG. 3 is a flow chart which discloses a method of sorting unsorted data words according to their scaled values in conformance with the principles of this invention.

Referring now to FIG. 3, which is a flow chart of the single pass sort method, the first step (block 10) is to define the value of "n" for the Shift Right instruction. The value "n" is devised such that the most significant digits of the unsorted data word are used as part of a store instruction in order to store the data word at a scaled address location in the primary sort table. In order to perform this operation, the sort tables have been created with sufficient memory locations to store an entire data word at any possible address employing an address increment formed from those significant digits of the data word. The number "n" must also be devised such that the scaled value formed from the data word will fit within the address portion of a Transfer to Storage instruction. Specifically, "n" is defined to be the power of 2 of the maximum word length minus the power of 2 for the number equal or immediately greater than the size of the unsorted data table. For example, if the word length is 16 bits, including the sign, then the number 2 raised to the fifteenth power is the largest number held by that word. If the size of the sort table is 1,024, or 2 raised to the tenth power (as defined above) then "n" is equal to 15 minus 10, which is 5.

This determination of "n" can be conveniently done by designing a lookup table for the word length at hand. For example, if the unsorted data table size is between 256 and 512, then "n" equals 6 for a 16-bit word length. If the unsorted table size is between 512 and 1,024, then "n" equals 5 for a 16-bit data word. Alternately, the determination of "n" can be a part of the initial setup since the size of the sort table must be specified at that time.

The next step in this method (block 12) is to read an unsorted word into an accumulator register 5 (FIG. 1)

from memory. If the word is zero or negative, the word is stored unsorted in memory 8 (FIG. 1) for separate processing by the identical procedure for negative words (blocks 14 and 16). The control then passes to "index word" (18) and the next word is read. The use of the term "control" is only an aid in following the flow diagrams of FIGS. 3-7, but in actual operation the control module 3 of the computer always controls the operations.

If the word is positive, then the Shift Right "n" instruction is given according to block 20. This instruction shifts the data word to the right and eliminates "n" columns from the right (least significant) side of the word. This has the effect of dividing the value of the word by 2 raised to the nth power. Thus a scaled value shall now be created that fits within a range defined by the beginning and end of the primary sort table addresses. This value can be considered an address increment. By way of example, if the sign value is ignored and the data word read were to be 123456 and the Shift instruction were given for "n" having a value of 2, the scaled value would now be equal to 1234. In binary, of course, this would be the same as dividing the data word value by 4 (101010 shift by n=2 gives 1010). In this way, the scaled value is formed from the most significant bits of the binary data word. In the Shift Right instruction, an obvious requirement is that "n" be set such that after shifting, the address increment created will be sufficiently small to fit within the address portion of a store instruction.

The next step (22) is to create a new address by adding the above constructed address increment to a store instruction whose address portion is the beginning address of the sort table. Often, the primary sort table constructed in memory will begin at an address other than 0000, as shown. By adding the address increment to the address portion of the storage instructions, a new address is developed. In this case, the exemplary binary address increment is 1010 and is added to address portion 0000 to produce scaled address 1010. Thus this method prepares to store the unsorted data word, in its entirety, in a sort table address which is scaled to the value of the unsorted data word. Since these scaled values may occasionally recur, a test must be performed to determine if there is already an entry stored at the identified address.

According to step 24, the identified address is tested to see whether an entry has already been placed there. This indication is signified by either a non-zero entry at the address, if this is the first time there is a duplicate scaled value, or a special indicator such as a negative sign bit which indicates a previous conflict between equal scaled values. Any indication that something has already been placed in the new address signifies a conflict which must be resolved. This conflict resolution procedure is described in detail below and illustrated in the flow diagram of FIG. 4.

Absent the conflict, the procedure is to store the full data word in the sort table at the new address per block 26. Following the storage, appropriate indexing is made to the next unsorted word according to block 18. Preparation is then made for processing the next unsorted word. At block 18 a test is also made to determine if all the unsorted words have been processed. If not, control returns to block 12 and the next unsorted word is read into memory and processed.

If all the unsorted words have been processed, the procedure is then to gather the sorted words into a single sort table, according to step 28. This gathering and merge procedure is defined in detail below and illustrated in FIGS. 6 and 7. At the end of the processing, the single pass sort procedure is completed.

Figure 4:
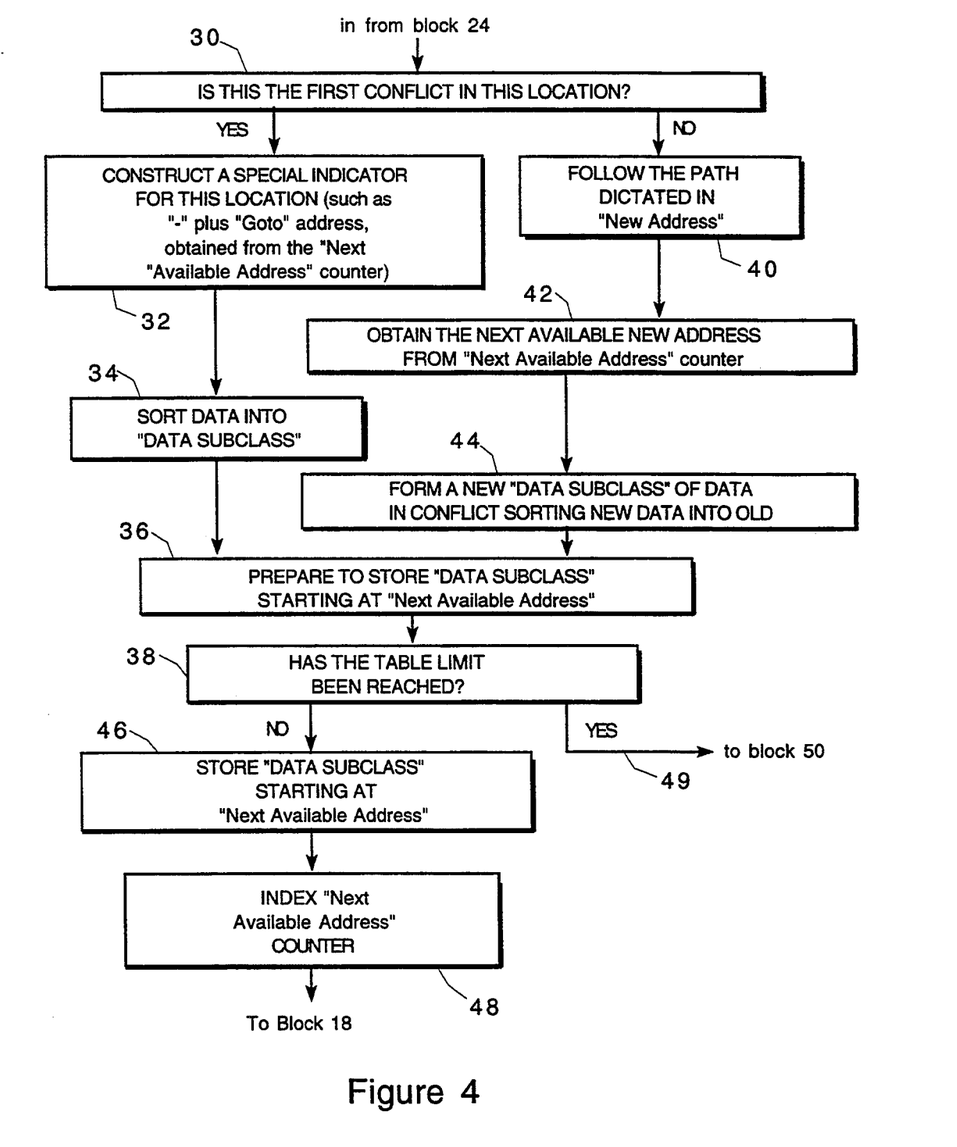
FIG. 4 is a flow chart which discloses a conflict resolution procedure for data words having equal scaled values.

Referring to FIG. 4, which illustrates the conflict resolution procedure for data words having equal scaled values, the procedure will now be described in detail. Assuming that there is a conflict, i.e., multiple data words seeking the same address, the routine is shifted from block 24 to block 30 of FIG. 4, as shown by arrow 25. At block 30, it is determined whether this is the first conflict to be resolved in this address location. If it is the first conflict at this location, it is necessary to construct a special indicator for this location, block 32. This special indicator, in the case of sorting positive numbers could, for example, include a negative sign in the sign position and a "go to" (Goto) address in the remainder of the word. This address, the subject of the Goto instruction, is obtained from a next available address counter, which keeps track of the next available storage addresses in an auxiliary storage table. The next available address counter keeps track of where the data in conflict may be stored in the auxiliary storage. These conflicts are thereby added on to the end of the table beyond primary sort table I, in which is placed non-conflicting sorted data. Such data conflicts are thereby stored sequentially in auxiliary storage following sort table I (FIG. 2B). Specifically, the conflicts occupy the storage locations specified as auxiliary sort table II and prior to any gathering, auxiliary sort table III.

Proceeding to block 34, a data subclass is created from the two conflicting data words that had been seeking the same address. This first conflict is relatively simple since there are only two words in conflict at this point and is merely a matter of storing them in order depending on which is greater. They can thereby be placed in ascending order through direct comparison. A third word, called a limit word, is added to the data subclass in preparation for storage at the next available address (36). The limit word is constructed of special characters not found in the data such as all X's or all "@" typed characters. The purpose of the limit word is to tell the gathering routine that it has reached the end of the data subclass. After this instruction is completed, control is passed from block 36 to block 38, which tests for whether sufficient auxiliary storage is available for storage of the data subclass without writing over previously stored data.

Another path is followed if this is not the first conflict between data words seeking the same address, which is tested for in block 30. If the answer to the question is "No," control is passed to block 40 which follows the path dictated in the register into which the conflict is directed. The special indicator and Goto address instruction are read from the conflict address and used to determine the location of the previously stored data in conflict. In other words, this tells the program where to find the previously stored data subclass that resolved the earlier conflict. At block 42, the next available address is obtained from the next available address counter as explained previously so as to identify the location for the new data subclass. This next available address is inserted with a Goto code into sort table I to replace the previous Goto address stored there when the prior conflict was resolved.

At block 44, the program forms a new data subclass from the conflicting data words by inserting the new data word in the appropriately sorted location. This procedure is a straightforward one in which each word of the old data subclass is rewritten into a new location. At each rewrite a test is made to determine whether or not the new word to be sorted should be inserted due to its numerical value. Following the rewrite, all the data words that were previously seeking the same primary sort address due to equal scaled values are properly sorted and a limit word is appended to complete a new data subclass. Note that this new data subclass is stored beginning at the new address in auxiliary storage as determined by the next available address counter. Further, the old data subclasses still exist in auxiliary storage but are ignored in further processing since the Goto address in the primary sort table now leads the program to the newest data subclass.

After the new data subclass has been formed and the limit word appended in blocks 44 and 36, data subclasses created by either path described above are held in the control memory 4 of the central processing unit 2, while a test is made as to whether or not the table limit has been reached (38). This table limit is defined as the end of table III prior to any intermediate gatherings of data and the end of table II thereafter, as explained below, in order to avoid overwriting sorted data. If the limit has not been reached, the new data subclass which is composed of two or more data words, depending on prior conflict, are stored starting at the next available address, block 46. Thereafter, the next available address counter is indexed (48) according to the size of the data subclass, and control passes back to block 18 of FIG. 3. At block 18, assuming there are more words to be sorted, the unsorted data is indexed and the next word is read into the accumulator register for sort.

If, however, the auxiliary storage table limit has been reached (38), then an intermediate gathering must take place. Control therefore passes from block 38 along arrow 49 onto the flow diagram of FIG. 5. Block 50, representing CPU memory, preserves the data subclass that was created according to the logical steps of FIG. 4 for later insertion into the sorted data. The program then checks (52) whether this is the first time that the storage of data in conflict has reached the end of the designated space, which is to say the end of sort table III (FIG. 2B). If the answer to the question is "Yes"; i.e., there has been no prior intermediate gathering, then the next step (54) is to then gather the sorted data eliminating zeroes (unused addresses). This gathering procedure is defined in detail below in reference to FIGS. 6 and 7. The result of this gathering is stored in auxiliary sort table IV, as shown in step 56 and the program returns to block 18.

Figure 5:
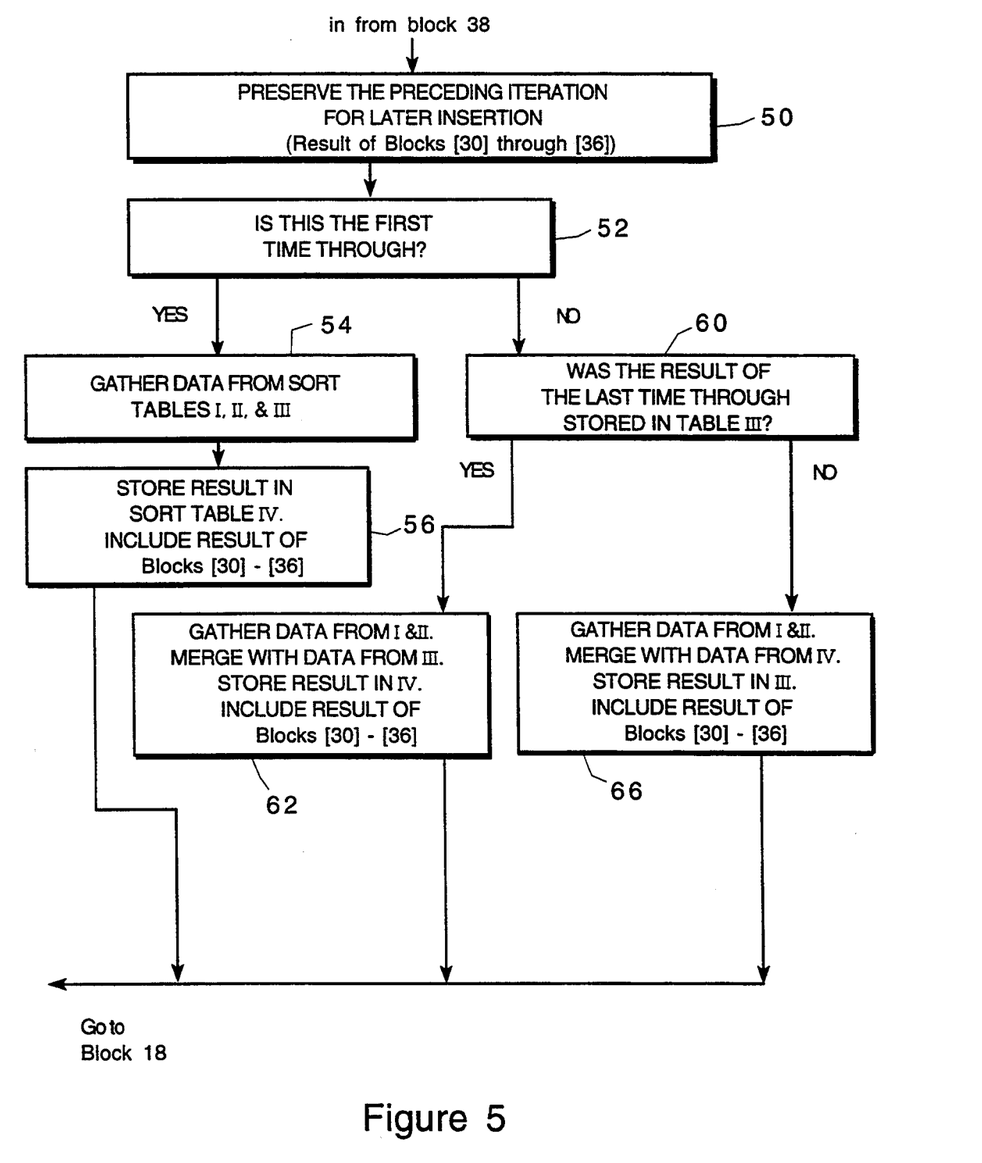
FIG. 5 is a flow chart which discloses a data gathering procedure for use when insufficient unused addresses remain in the data storage tables for insertion of sorted data.

If, however, this is not the first time there has been an intermediate gathering, the procedure is a little different following block 52, since the limit of auxiliary storage of data subclasses is the end of table II. This is because prior gatherings will have resulted in a merge table being created in table III or IV. The program must therefore first determine whether the data from the last intermediate gathering was stored in table III or table IV (step 60) in order to avoid overwriting previously merged data. If the answer is that the data was stored in table III, then sorted data is gathered from tables I and II and merged with data from table III. The merged data is then stored in table IV (block 62) and tables I, II and III are cleared of data. As may be seen, the next step is to return the program to block 18 of FIG. 3. If the answer to the question asked at block 60 is "No," then the data gathered in the last intermediate merge was stored in table IV. As a result, the program (block 66) gathers the data from tables and II and merges it with that already existing in table IV. The result is then stored in table III and tables I, II and IV are cleared of data. In all of the above gathering scenarios, the last derived data subclass, which has been preserved in CPU memory according to block 50, is inserted into the merged and gathered data at its correct location. After the data has been gathered and merged and is inserted into table III, the program once again returns to block 18. Thus, at the end of these procedures, the intermediate merge of sorted data is stored in sequence in either auxiliary sort table III or sort table IV.

Figure 6:
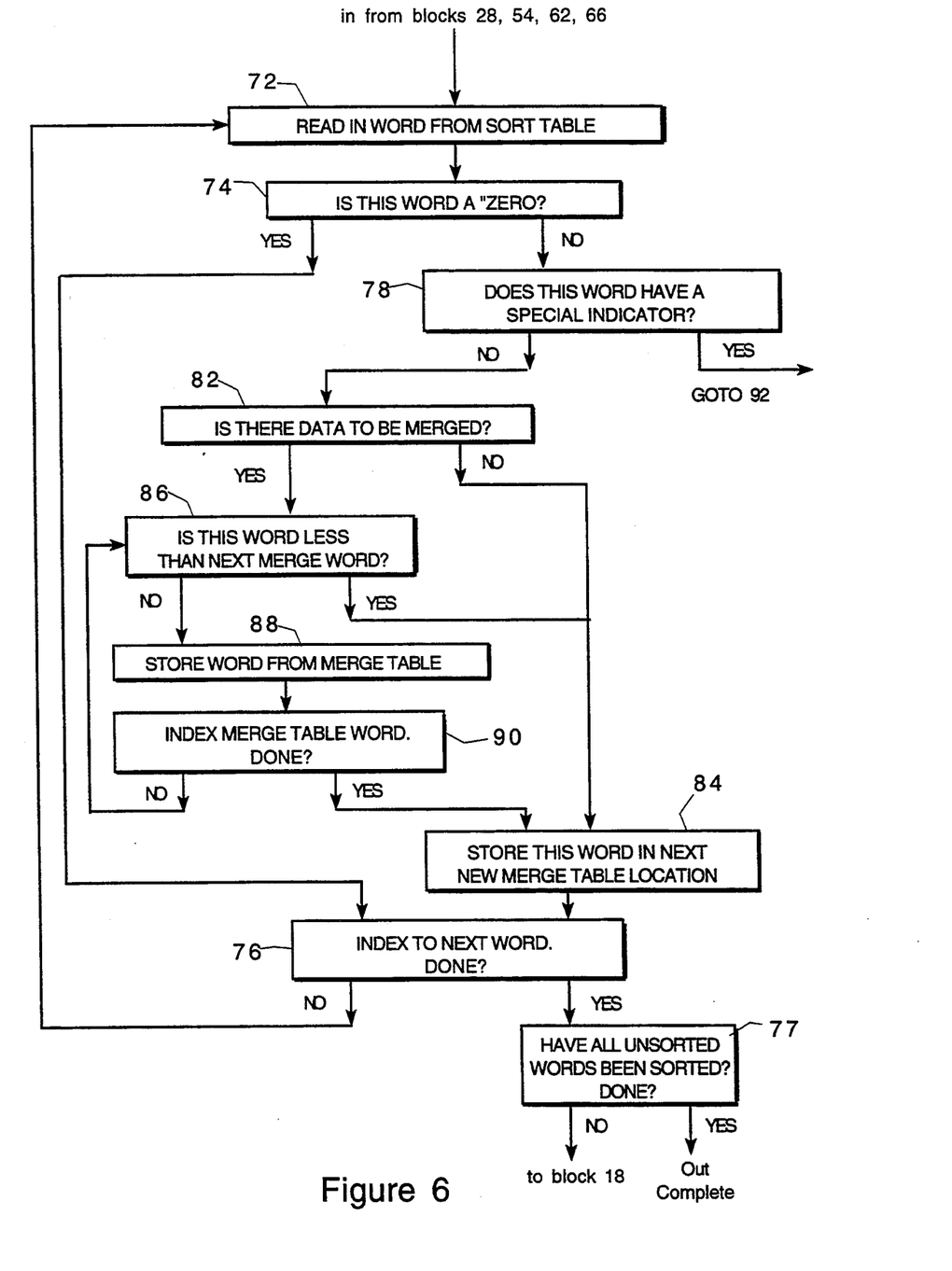
FIGS. 6 and 7 are flow charts which disclose the gathering and merge procedure which serves to combine all the previously sorted data into a single, compact, sorted data table.
Figure 7:
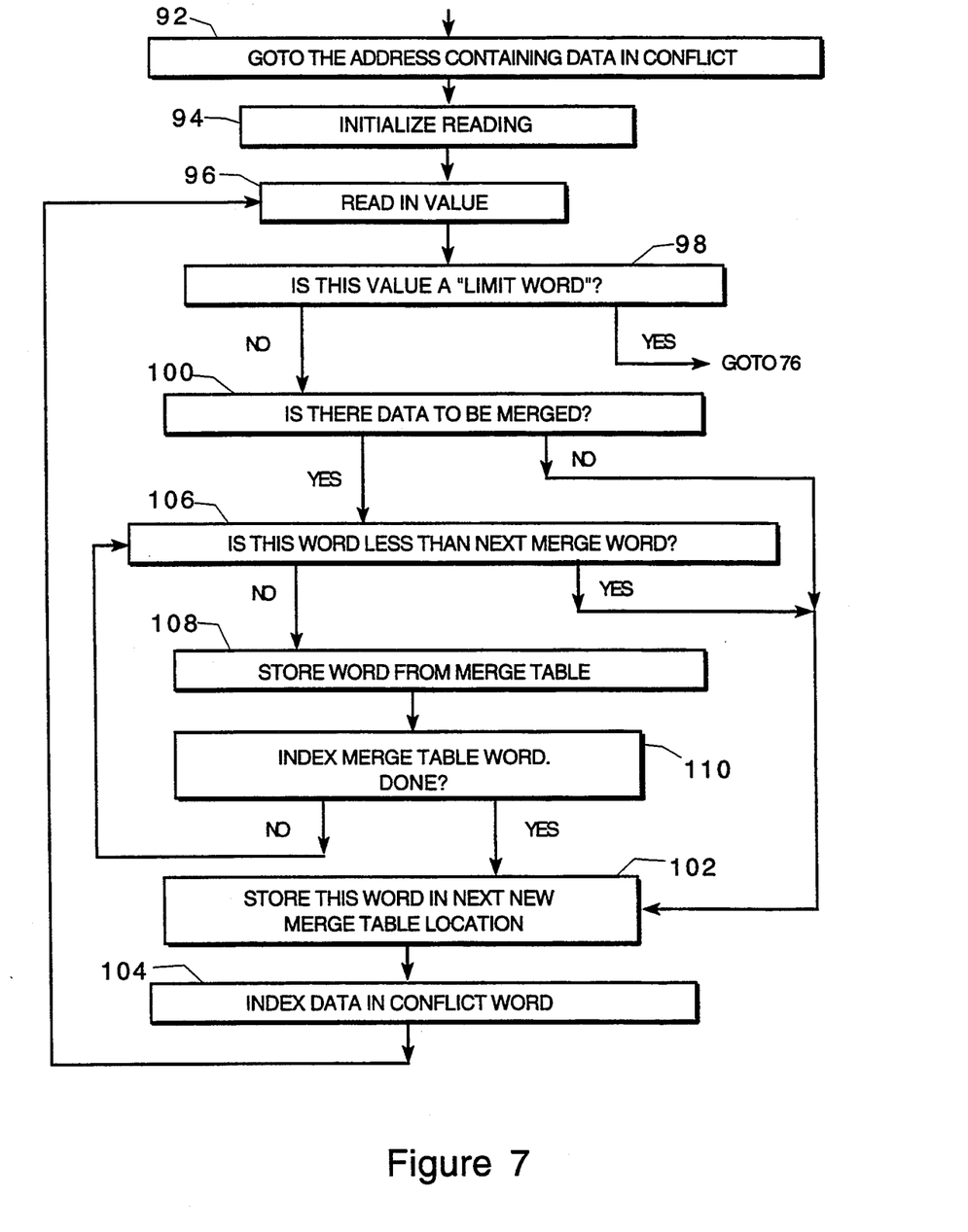

Turning now to FIGS. 6 and 7, which should be considered together, the gathering and merging procedure will be considered in detail. Intermediate gathering is performed to assemble all the data that has been sorted up to that point in the process. This is accomplished by sequentially addressing and reading the data at the primary sort table. Links are established by the Goto instruction to gather stored data in the auxiliary sort tables. In other words, this gathering is required when the sort tables following sort table I are filled with data added from conflicts and no further storage space is allocated from memory. Thus, this compression technique is implemented to sequentially link the data stored up to that point and eliminate unused storage locations. The result of an intermediate gathering is a table of sorted data (merge table) which must later be merged with subsequently sorted data.

This data compression is also required as the final step in the single pass sort process. The gathering is employed to compress all the sorted data into one table and to finally merge all the auxiliary data tables into the sorted data table. This includes inserting all the data subclasses that have been created.

Referring now to FIG. 6, block 72, a sorted word is read from the primary table for sorted data. In the event that this word is a zero or a null entry, it is ignored and control is routed by way of block 74 to index block 76. The program is thereby indexed and the next word in order is read in from the primary sort table.

For non-zero entries, wherein data or a special indicator has been inserted into the address, the next question to be asked at step 78 is whether or not the special indicator has been inserted at this word location. If a special indicator has been inserted therein, it indicates that there was a conflict between equivalent scaled values and the program proceeds to the location where the conflict is stored (block 92, FIG. 7). This is facilitated by the insertion of the address of the data subclass after the special indicator. The first data word of the data subclass is then read in as described below.

Assuming there is no special indicator, the data word is read and the program proceeds to block 82, which questions whether there is data to be merged with the sort table data. If there is no data to be merged, then the data word ("this word") is stored in the next new merge table location, according to block 84. This is followed by an index to the next word in the primary sort table, at block 76. If the data word from the primary sort table is to be merged with a table created by an intermediate gathering as discussed above, then a comparison is necessary between the data word ("this word") and words from the intermediate merge table which is to be merged into the new merge table. This is done at block 86 by determining whether "this word" is less than the next merge word. If the answer to the question is "Yes,"

then the control transfers back to block 84 and the data "this word" is stored since in the preferred embodiment the data is sorted into ascending order. If the answer is "No," however, then the word from the merge table is stored, and the next word in the merge table is indexed as shown in block 88 and 90. Assuming there is more data to be found in the merge table, the process iterates back to block 86 to compare the merge word with "this word" from the sort table. When all data from the merging table have been processed, or when the sort word ("this word") is less than the merge word, the program transfers to block 84, which stores "this word" and leads the program to index to the next word from the sort table.

If all the words from the sort table have been sorted into the new merge table (DONE?), the CPU exits the program to block 77. At block 77, the program tests to see if all the unsorted words have been read in from the unsorted data table 5 (DONE?), if they have, the single pass sort is complete, if not, the program returns to block 18 and continues to read in the unsorted words. When all the unsorted data has been read, all the data words will have been entered in sequential order in the last merge table to be created.

In FIG. 7, a schematic diagram is used to explain how gathering and merge procedure deals with a special indicator inserted into an address. At block 92, the program is directed to the address containing the data in conflict, constituting the beginning of a data subclass, and then to blocks 94 and 96 where data words are read in sequence, when the data word from the data subclass is read in, it is tested as to whether it is data to be sorted or is a limit word (98). If the value is a limit word, then control is passed back to block 76 of FIG. 6. This would not be the case if the computer has just entered this section of the program having been directed there by a special indicator. If therefore, the value read out of the data subclass is not a limit word, the program must next check whether merging is to take place simultaneously with the gathering of the data (100). If the answer at block 100 is "No," control proceeds to block 102 where the word from the data subclass is stored in the next location on the merge table. Thereafter, an indexing takes place to the next word in the data conflict subclass (104). The program will work through the data subclass until it reaches a limit word and exits this portion of the program.

In the situation where intermediate gatherings have taken place, there will be a merge table that must be integrated with the gathering procedure. Therefore, if the answer to block 100 is "Yes," then control is passed to block 106 where the word from the data subclass ("this word") is compared to the next word from the merge table. If "this word" is less than the next word from the merge table, the program exits the subroutine and stores "this word" in the next sort table location (102). If, however, "this word" is greater than the next merge word, the next merge word is stored first and the merge table is indexed as shown in blocks 108 and 110. This will continue to occur until the word from the data subclass "this word" is less than the next merge word at which point "this word" is stored. All the data words are thereby put in sequential order. Optionally, the program will exit the subroutine when the merge table end has been reached. This, of course, is similar to the merge routine as described in reference to FIG. 6 above. A further option that may be required if the unsorted data table contains data words of equal value. In this case, either one of the data words is eliminated or both are stored arbitrarily in sequence.

Thus, when these two last subroutines are finally complete, all the data words will have been inserted into a single data table in sequential order after only a single pass through the unsorted data table. The multiple iterations of the prior art are thereby eliminated. While this procedure does use considerably more memory than prior art procedures, one should note that the immediate problem in modern computers is speed as opposed to memory. The sort procedure of this invention has been tested against conventional sorts in a personal computer. A relatively random unordered data file was obtained by taking the last four digits from selected pages of the Greater Boston Telephone Directory White Pages. One hundred numbers, or approximately one column, were used from each of ten different pages distributed throughout the directory. These numbers appear to be randomly distributed, ranging from 0003 to 9999. Through a test of this program, it was seen that the sorting routine of this invention ranges between three and four times faster for an unsorted table of 100 numbers to one hundred fifty times faster than conventional sorting routines for an unsorted table of 1,000 numbers.

While the invention has been particularly described with reference to the preferred embodiment thereof, it will be understood by those skilled in the art that various changes in substance and form can be made therein without having departed from the spirit and scope of this invention as detailed in the attached claims.

I claim:

1. Digital data processor apparatus for sorting a plurality of unsorted data words into sequential order, said digital data processor comprising:

A. at least four storage table means—referred to as first storage table means, second storage table means, third storage table means, and fourth storage table means, respectively—each capable of storing a plurality of data words at addressable locations therein, B. address-forming means for generating an address for each of successive candidate ones of said unsorted data words, where each such data word has a value that can be represented by a plurality of digits arranged in order of increasing significance, and where each such address is generated by shifting the digits representing the value of the corresponding data word to remove therefrom one or more digits of least significance, C. primary sort means, coupled to said address-forming means, for testing said first storage table means at a location corresponding to the address of a candidate data word to determine whether that location is occupied by at least one prior data word, said primary sort means including means for responding to a negative such determination for storing that candidate data word in said first storage table means at that location, said primary sort means further including means for responding to a positive such determination for (i) storing said candidate data word and said at least one prior data word in said second storage table means at a next available addressable location therein, and (ii) storing in said first storage table, at said location corresponding to the address of the candidate data word, a signal representative of that next available addressable location, D. merge/gathering means, coupled to said at least four storage table means, for determining whether a remaining storage capacity in said second storage table means is sufficient and, if not, for storing in a selected, alternating one of said third storage table and said fourth storage table means a sorted list of data words formed by merging data words stored in the others of said storage table means, and for clearing said others of said storage table means to permit storage therein of further data words.

* * * * *